March 20, 1956 W. G. PFANN 2,739,045

SEGREGATION PROCESS

Filed Dec. 8, 1953 3 Sheets-Sheet 1

INVENTOR
W. G. PFANN
BY
George S. Indig
ATTORNEY

March 20, 1956 W. G. PFANN 2,739,045

SEGREGATION PROCESS

Filed Dec. 8, 1953 3 Sheets-Sheet 2

INVENTOR
W. G. PFANN
BY George S. Indig
ATTORNEY

March 20, 1956 W. G. PFANN 2,739,045

SEGREGATION PROCESS

Filed Dec. 8, 1953 3 Sheets-Sheet 3

INVENTOR
W. G. PFANN
BY George S. Indig
ATTORNEY

United States Patent Office 2,739,045

Patented Mar. 20, 1956

2,739,045

SEGREGATION PROCESS

William G. Pfann, Basking Ridge, N. J., assignor to Bell Telephone Laboratories, Incorporated, New York, N. Y., a corporation of New York Application December 8, 1953, Serial No. 396,833

14 Claims. (Cl. 23—309)

This invention relates to processes for redistributing ingredients of fusible solvent-solute systems for the purpose of producing material of desired composition. In their more usual applications the processes of this invention utilize variations in solute solubility in adjacent solid and liquid phases in the material being treated to segregate solutes and may be applied to systems of metals and their alloys, to salts and salt solutions, both organic and inorganic, and to other solvent-solute systems which can be caused to undergo a liquid-solid transformation. All of the processes of this invention are continuous in the sense that materials may be continually fed in and products drawn out.

For convenience the processes of this invention will be described in terms of a binary solvent-solute system in which it will be assumed that the solute is the impurity to be removed and that $k$, the distribution coefficient, defined as the ratio of the solute concentration in the solid freezing out of a molten zone to that in the liquid in the zone, is constant and less than 1. It is to be understood that the solute could just as well be considered to be the product which it is desired to recover, that the processes work equally well for systems having a $k$ value greater than 1 and further that the invention is not to be limited to its application to binary systems. It should be noted that the constant $k$ is identical to and is here used in place of the lower case Greek letter gamma ($\gamma$) which latter symbol has been used in several of my prior patent applications.

Where the system undergoing treatment is a semiconductive material such as, for example, silicon or germanium alloyed with small portions of solute or solutes to which present theory ascribes the extrinsic semiconductive properties of the aforesaid materials, these solutes are known as "significant impurities" or "significant solutes." Due to the high order of purity required in the production of semiconductive materials such as those above set forth, and due to the favorable separation constants which characterize such systems, the processes of this invention are particularly well adapted to the purification of these materials for use in rectifiers, transistors and other semiconductive transducers.

The processes of this invention utilize the principles of what will be herein referred to as "batch zone-refining" which principles are amply set forth in my article "Principles of Zone-Refining," Journal of Metals, volume 4, page 747, 1952, and which processes are described and claimed in my copending application, Serial No. 256,791, filed November 16, 1951. In one form, batch zone-refining consists of slowly passing a series of molten zones through a long solid ingot or charge of impure substance, each molten zone, for a system having a $k$ value less than 1, causing a net transfer of impurity toward the end of the charge in the direction of travel of the zone. It has been shown that extremely high purity can be attained by this process. For example, by batch zone-refining, a concentration of significant donor impurities in germanium has been reduced to less than $2\times10^{12}$ atoms per cubic centimeter of germanium which, in this example, was less than one donor atom per $10^{10}$ atoms of germanium. (W. G. Pfann and K. M. Olsen, Physical Review, volume 89, page 322, 1953.)

It is well known in the field of separation methods that continuous processes have certain advantages over batch processes. It is an object of this invention to perform zone-refining on a continuous basis in order to obtain these advantages and in addition to increase the scope and utility of the zone-refining method.

A particular aspect of zone-separation with respect to which the use of a continuous method increases the scope or field of the application of zone processes, is as follows: In crystallization work, it is common practice to remove an impurity B from a crystalline substance A, by dissolving both A and B in solvent C. Upon crystallizing solid from the solution of A and B in C a separation between A and B greater than that which would be obtained by crystallization in a binary system AB frequently results. If one were desirous of using a common solvent C in order to improve the separation generally obtainable in batch zone-refining the binary system AB, it would generally be necessary to introduce a fresh supply of solvent C each time a heated region entered the beginning of a charge, and as a result the operation of the process would become more complicated. In a continuous process, however, such as for example, any one of those of the present invention, the solvent may be continuously introduced as part of the feed and may be continuously withdrawn with the top and bottom products. Thus, insofar as operation of the refiner is concerned, handling such a ternary or higher order system is just as simple as handling a binary system.

Since the processes of the present invention are considered to be the counterpart in the field of crystallization of the continuous fractionation column in the field of distillation, it is convenient to make reference to terminology and methods used in continuous fractional distillation processes. It should be noted, however, that although a similarity exists between distillation methods and zone-refining methods, there are basic differences between the two processes. These differences will become evident as the description proceeds.

In batch zone-refining molten zones slowly travel through a solid charge or ingot carrying impurities with them (for a system having a $k$ value less than 1) and thereby effecting a separation of solutes and solvent. In general, no material flows into or out of the apparatus in which the charge is contained during the separation process.

The present process accomplishes the result of separating solute and solvent just as in batch zone-refining, but in addition superimposes, on the motion of the zones, the flows of feed, waste and product. The container may now be considered to be a column having an enriching section and a stripping section, feed being introduced intermediate the two sections, and product and waste, or first and second product, being drawn out at either end. In such a process net material flow is away from the feed inlet in both sections. It will be shown below that the motion of the molten zones constitutes reflux and that reflux ratios can be defined and controlled during the operation of the process.

The processes of the present invention accomplish both forward and countercurrent flow without the use of any mechanical means except for the moving of heating surfaces in a simple one-channel column.

Although the continuous fractionation column contains a rectification section, a stripping section and a provision for feed introduction intermediate the two, and although product and waste are continuously withdrawn from either end of the column, it is apparent that the principles of continuous fractionation may not be directly applied to the process of zone melting. In a liquid-vapor transfer processes, such as fractional distillation, feed may be readily introduced at any desired plate or position in the column due to the compressibility of the vapor phase of the system and the non-adherence of the liquid phase to the walls of the column. This is not, however, so easily achieved in liquid-solid transfer processes in which the liquid phase is not compressible to any appreciable extent and in which the solid phase, due to adhesion to the walls of the column, may not be caused, with facility, to slide away from the feed inlet and so make room for the addition of the new material. Methods of accommodating introduction of feed material include the process by which the solid material is caused to adhere, not to a fixed portion of the apparatus, but to a moving track and in which a separate counterflow of molten material is maintained such as is described in my copending application, Serial No. 302,921, filed August 6, 1942. Another means of accomplishing such a result is by causing the processing to take place in separate stages with each stage in a separate enclosure. A continuous zone-refining process based on such a plan is described and claimed in my copending application Serial No. 298,553, filed July 12, 1952.

In essence, the processes of the present invention achieve the above results by causing "voids," that is, regions in which there is a substantial deficiency of material of the system undergoing treatment to pass through the apparatus. These voids are created by removing from an end of the column an amount of liquid less than the total contained within a molten region each time the material at that end of the column is molten. These voids may be gaseous or substantially evacuated regions or may be filled with displaceable and substantially immiscible fluids. The voids, which are generally associated with molten zones so that there is one void for each molten zone generated, will then accommodate a predetermined amount of feed which may be allowed to flow in as the void passes the feed inlet. If the void has been substantially evacuated, feed simply flows in and fills up the entire space. If, on the other hand, the void is actually a fluid region, this fluid is displaced by feed. In the processes of the present invention this displacement is accomplished by virtue of a difference in density between the molten material of the feed and the fluid in the void.

For convenience, the following description is in terms of processes in which the molten material introduced at the fed is of greater density than that contained in the void so that in the general case the fluid in the void will bubble through and will, therefore, be displaced by the molten feed material. The process in which feed material is caused to rise through and thereby displace a heavier immiscible void fluid, however, also operates according to principles of this invention and is considered to be part of it.

In the description of this invention the term "void" is used to connote a substantial absence of material undergoing treatment. Voids may, therefore, be evacuated regions or may contain material which is liquid or gaseous at the operating temperatures. It is a general requirement of the material in the void that it be substantially immiscible, if a liquid, with the molten phase of the system undergoing treatment. However, where it is desired that the void fluid have some effect on the composition of the system, it may be partially miscible or soluble in the molten material undergoing treatment.

These and other features of the invention will be more readily understood from the following detailed description when read with reference to the accompanying drawings, in which.

Figure 11A:
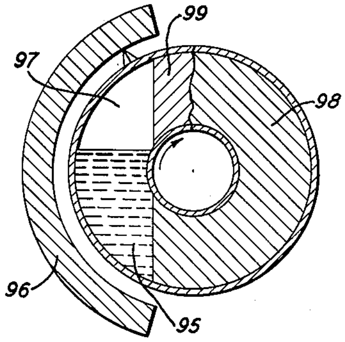
Figure 11B:
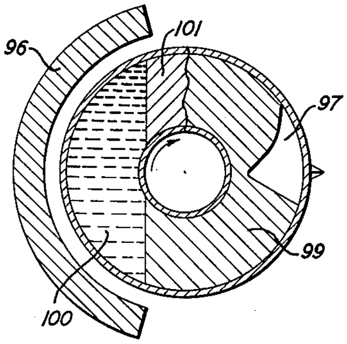
Figure 11C:
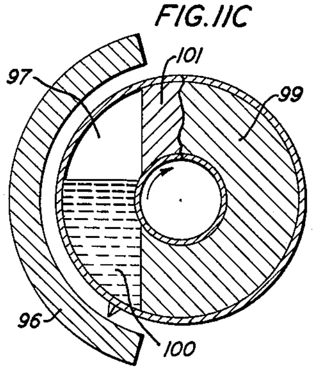
Figure 12:
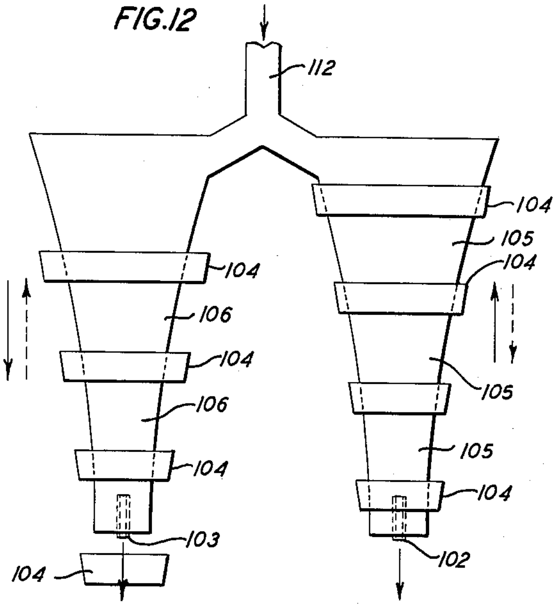
Figure 13:
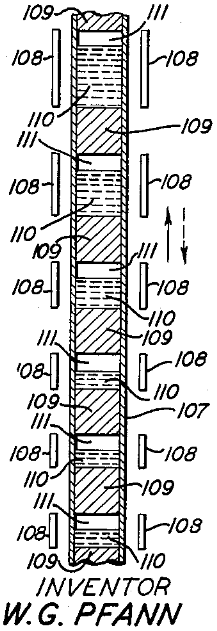

Figs. 11A, 11B and 11C, showing an end view of the stripping section of a spiral drum void refiner, depict the motion of a void during one complete revolution of the refiner;

Fig. 12 is a diagrammatic front elevation of a column process in which the apparatus designed is such as to permit varying reflux ratios as the material progresses through the column; and Fig. 13 is a diagrammatic front elevation of a section of an enriching or stripping column process which like that of Fig. 12 has provision for varying the rate of reflux as the feed inlet is approached.

Referring again to Figs. 1A through 1F, the equipment depicted is a frontal elevation of a portion of the enriching section of a column apparatus.

In the enriching section depicted, heaters 1 continually move, in effect in an upward direction along column 2 so as to create molten zones 3 within the apparatus. The material of regions 4 within column 2 and not within heaters 1 is solid.

In these figures and also in Figs. 2A through 2F, Fig. 3 and Fig. 13, heating elements have been depicted schematically as bars corresponding with non-solid regions within the columns. Physically the heaters generally encompass the column and for a column having a circular cross-section are annular in cross-section. Further, the correspondence of non-solid regions within the column to heaters without is not generally as exact as shown, the former usually lagging behind the latter. The heaters depicted may, therefore, be considered to be the effective heating elements as seen from within the column. The regular flat interfaces shown are not to be expected in operation and are not essential, the idealized schamatics being intended merely for ease of description.

The heating elements themselves may consist of any conventional heating means such as resistance or high frequency windings, or burners, or for a normally liquid material may represent positions not occupied by cooling elements.

By means of the reentrant outlet tube 5, liquid is restrained from running out until the top of the lowest heater 1 is above the top of the reentrant tube 5. Thereafter, since heaters 1 are longer than reentrant tube 5, liquid flows out as lowest heater 1 advances until the lower extremity of heater 1 coincides with the lower extremity of column 2. Further travel causes the lower end of outlet tube 5 to freeze over and to prevent further flow until the next cycle. Were it not for reentrant tube 5, all of the molten material within a heater would run out of column 2 at the bottom of the column until the lower extremity of each heater 1 coincided with the lower extremity of column 2 or until the lower opening of the column was otherwise blocked by solid material. This would result in a series of voids traveling through the rectification section, but since no molten material would be present in the column there would be no interphase segregation of solute. The result would be a flow of matter from the feed inlet, caused by the displacement of the material inside of each void by material undergoing treatment, to the outlet with no segregation of ingredients.

Figures 1A, 1B, 1C, 1D, 1E, 1F:
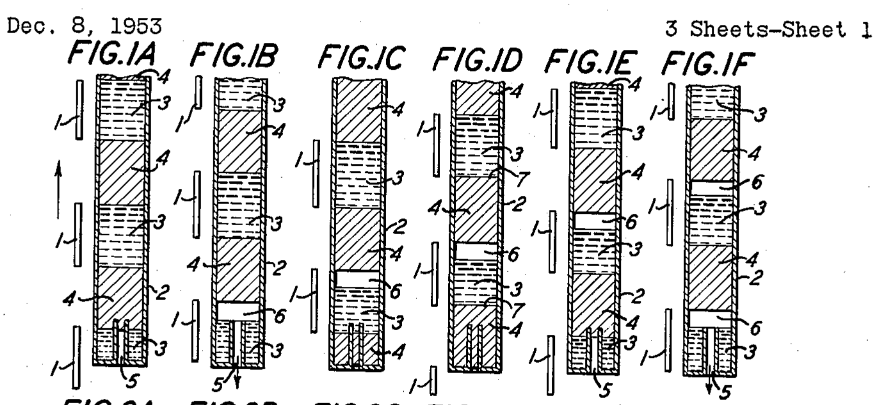
Figs. 1A, 1B, 1C, 1D, 1E and 1F are front elevations of the bottom section of a rectification or enriching section, of one type of apparatus in which the processes of this invention may be carried out depicting void generation and travel.

In Fig. 1A the apparatus is just being started and the lowest heater 1 has advanced sufficiently to produce some liquid in the annular section about reentrant tube 5, but has not advanced far enough to permit any of the molten material in the lowest molten zone 3 to flow out through the outlet tube.

In Fig. 1B, first heater 1 has advanced sufficiently so that its lower extremity coincides with the lower extremity of column 2. It is seen that a portion of the molten material within this heater is allowed to flow out through tube 5 so as to create void 6, having a height equal to that of heater 1 minus that of reentrant tube 5. As has been discussed, for the purpose of this description, this void represents either an evacuated region or one containing material which is fluid at the operating temperature of the apparatus and which has a lower specific gravity than that of the molten material contained in molten zones 3.

In Fig. 1C, heaters 1 have advanced still further up the column so that a portion of the material within reentrant tube 5 has frozen over, thereby preventing the escape of any more of the molten material within lower molten zone 3.

In Fig. 1D, travel of heaters 1 up column 2 has progressed so that an additional heater is about to encompass tube 2. It is seen that passage of molten region 3 and void 6 is coincidental with travel of heaters 1 so that both regions are within the heater and so that there are at all times interfaces 7 between the trailing edges of molten zones 3 and leading edges of solid regions 4 which are the interfaces at which liquid-solid transfer takes place. As the heaters 1 advance, melting material from solid regions 4 drops through voids 6 and into molten zones 3. This material then mixes with the material already present in molten zones 3 which material is frozen out at interface 7, thereby meeting the requirements for zone-refining as described in my copending application Serial No. 256,791, above mentioned.

In Fig. 1E another heater 1 is now in a position corresponding with that of the lower heater shown in Fig. 1A.

In Fig. 1F this heater has advanced so that its lower extremity is coincident with the lower extremity of tube 2 and so that a second void 6 has been produced. The liquid flowing out of reentrant tube 5 in Fig. 1B and 1F and for the system having a $k$ value less than 1, represents material which is richer in solvent than that material at the upper portion of the column.

Whereas, in the enriching section molten zones travel toward and net flow of matter is away from the feed inlet, as shown in Figs. 1A through 1F, in the stripping section both the motion of the molten zones and the net flow of matter are in the direction of the outlet. Voids in the stripping section may be created by a void generator similar to the reentrant tube 5 shown in Figs. 1A through 1F. Here the relative motions of voids and molten regions are different, the molten regions being caused to travel in a downward direction and voids bubbling up through them as they come into contact with each other. Again the volume of the voids is determined by the relative lengths of the heater and reentrant tube or other type of void generator. Void volume in the stripping and rectification sections may be controlled independently.

The creation and travel of voids in the stripping section may be seen more clearly by reference to Figs. 2A through 2F. These views all depict the lower portion of a stripping column 7 with succeeding views showing the manner in which the first and second voids are produced within the equipment as it is first put into operation. In all of these views the motion of the heaters 8 is downward. The voids are produced by an external outlet tube type of void generator 9 which will be discussed in detail in connection with Figs. 8A through 8H.

Figures 2A, 2B, 2C, 2D, 2E, 2F:
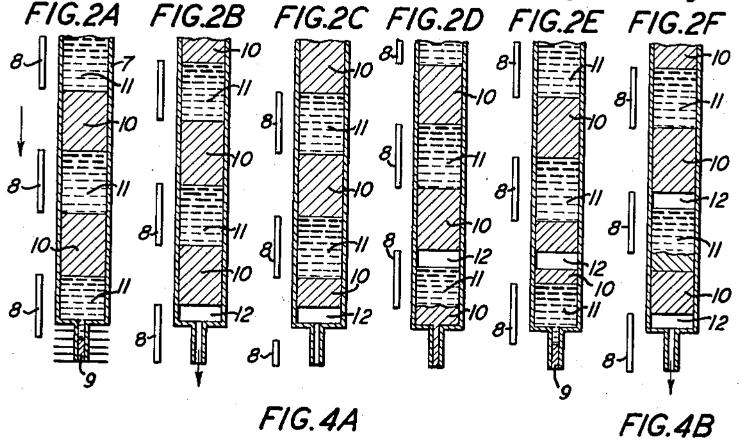
Figs. 2A, 2B, 2C, 2D, 2E and 2F are similar front elevations of a bottom section of a stripping section of an apparatus in which material is undergoing treatment according to the teaching of this invention and showing the manner in which a void is generated and caused to travel.

In Fig. 2A, as the equipment is started up there are present only solid regions 10 and molten regions 11, the latter coinciding with heaters 8. No voids are present, the molten material in lower region 11 being restrained by the solid material in the lower extremity of tube 9.

In Fig. 2B, the heater has advanced so that its lower extremity coincides with the bottom of tube 9 thereby allowing a portion of molten material to run out of the column and thereby creating first void 12.

In Fig. 2C the heaters 8 have advanced in their downward direction. It is seen that the only change that has occurred is the downward advancement of molten zones 11 and the consequent reduction in height of solid region 10 immediately above the first void 12 which void, being unable to pass through the solid region immediately above it, remains stationary.

In Fig. 2D the bridge of solid above void 12 of Fig. 2C has been melted through and void 12 has bubbled through the molten region 11 immediately above it so that in the view shown the void is directly above the molten material of lower zone 11.

In Fig. 2E it is seen that further downward motion of the heater causes void 12 to be entrapped within a solid region 10 but that the lowest molten zone 11 has continued to proceed in a downward direction.

In view 2F the heater has again proceeded sufficiently far to permit the escape of a portion of molten material through tube 9 thereby creating a second void 12. Further advance of heaters 8 causes successive advances of liquid down and voids up the column in this section. The broken views of Figs. 1 and 2 combine to show material rich in solvent leaving the enriching section and material rich in solute leaving the stripping section, all for a system having a $k$ value less than 1, that is, for one in which the solute concentration is greater in the molten phase than in the solid phase at the interface at equilibrium.

Figure 3:
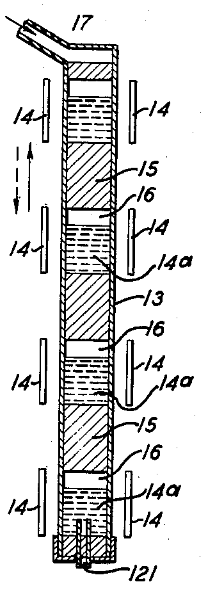
Fig. 3 is a front elevation of the enriching section of a similar piece of apparatus.

Fig. 3 is an elevation of either an enriching or stripping section depending on the direction of motion of the heaters and also shows a feed inlet. In the processes herein described, there must be a net flow of matter from the feed inlet to each of the enriching and stripping outlets. It will now be assumed that it is desired to recover purified solvent so that the outlet in the enriching section will be considered to be the product outlet and the outlet of the stripping section, the waste outlet. It is, of course, understood that the outlet roles could well be reversed or that they could both be considered to be product outlets. Liquid flow is brought about by creating voids in the column at the waste and product ends and by causing these voids to travel to the feed inlet where they are filled with feed liquid. As has been discussed in connection with Figs. 1 and 2, voids are created by allowing liquid to flow out of the refiner. The cycle of creating a void, causing it to flow to the feed inlet and filling it with feed liquid constitutes a net flow of matter through the column in the direction of the void generators. The rate of flow is controlled by the size, number and rate of travel of the voids.

The columnar section 13 depicted in Fig. 3 serves as an enriching section if the motion of heaters 14 is upward. Assuming the heater length $h$ in the direction of travel and sufficient heat interchange so that any solid within the heater is molten and any material outside of the heater is solid, it is seen that the upward motion of heaters produces molten regions 14a, solid regions 15 and voids 16, the latter of a height equal to $h-l$, where $l$ is the length of a molten zone. Where reentrant tube 121 is of negligible cross-sectional area as compared with that of the column, the length of this tube may be considered to be equal to that of a molten zone. This simplifying assumption will be made throughout this description so that the symbol $l$ will be used to denote either molten zone length or void generator tube length. As each void 16 passes under feed inlet 17, molten material of the system undergoing treatment flows into and fills the void, any material in the void, being of lesser density than the feed material, bubbling up through the feed inlet.

With heaters 14 moving in a downward direction, the section depicted in Fig. 3 functions as a stripping section and voids 16 behave in the manner described in connection with Figs. 2A through 2F, bubbling through molten zones 14a in intermittent fashion, rising toward feed inlet 17 and being filled in turn by molten material passing through that orifice.

Figure 4A:
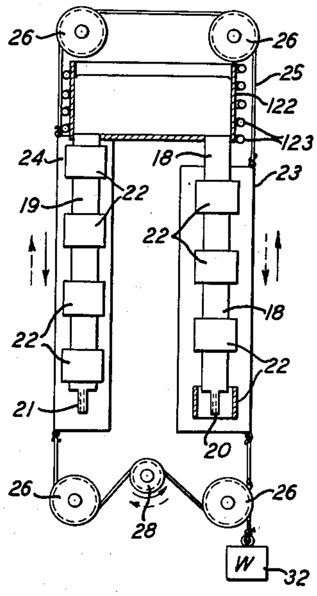
Fig. 4A and 4B are front and side elevations of a column process according to this invention containing an enriching and a stripping section together with a suitable mechanical arrangement for controlling the motion of the heaters which are responsible for the molten regions.
Figure 4B:
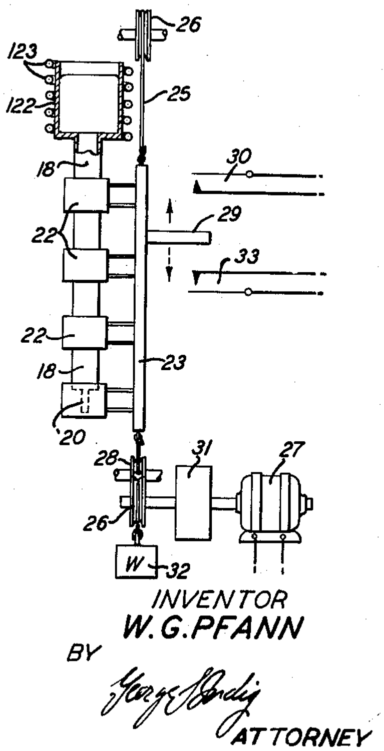
Figure 5:
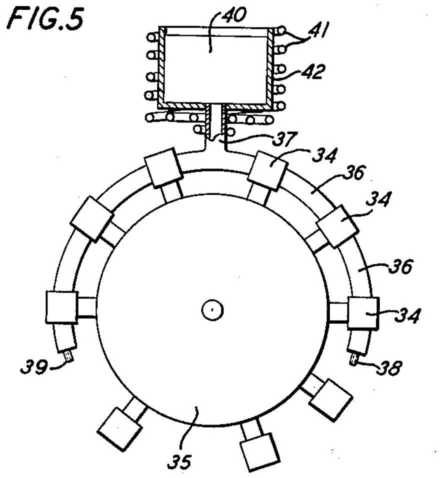
Fig. 5 is a front elevation of a modified column-type continuous refiner in which the motion of the heaters is rotary.
Figure 7:
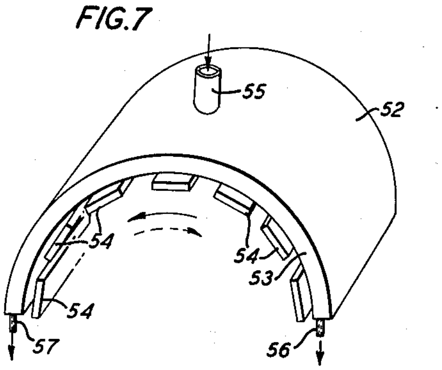
Fig. 7 is a perspective view of a column zone refiner using strip heaters.

Figs. 4, 5 and 7 depict three different types of column zone-void refiners. Before describing these in detail, various general requirements of such zone-void apparatus will be briefly noted. Since flow of material from the feed inlet into the voids is usually brought about by the influence of gravity, the column is either vertical or inclined. In general, if the void is evacuated or contains material of a lesser density than that of the molten material undergoing treatment at the operating temperature, the feed inlet is higher than the product and waste outlets. If, on the other hand, the density of the material in the voids is greater than that of the molten material undergoing treatment at the operating temperature, the feed inlet must be lower than the two outlets and the feed material will rise through the void fluid instead of falling through it at the entrant point.

In the design of any apparatus suitable for carrying out the processes of this invention, it is necessary that the exit flows of molten material be limited in such a way as to maintain molten zones in the column at all times. Means by which this may be accomplished have been discussed briefly and will be considered in more detail in connection with the views of Fig. 8.

In general, since it is desired to maintain any of the material undergoing treatment within the heaters in a molten state and any such material not within the heaters in a solid state, the walls of the column are uniformly thin and the heaters are closely fitted. It may be found advantageous to cool the surfaces of the column not within the heaters where columns of large diameter are used, where the melting point of the material undergoing treatment approximates the ambient temperature or where heat transfer is otherwise inefficient.

In describing the operation of the various types of apparatus herein described, it is assumed not only that the material undergoing treatment within a heater is molten and that the other material within the column is solid, but also that the material in the feed inlet is at all times in a molten state or, in any event, that it is in a molten state during a period sufficient to allow feed to flow into each void as it passes under the inlet. It is also necessary that all zone-void apparatus be designed so that the walls of the outlet tube do not permanently remain cool and thereby block the system.

It may be here noted that it is not necessary that a void occupy the entire cross-section of the column as has been indicated in Figs. 1, 2 and 3. In general, in a vertical column of circular cross-section, a small void will tend to be annular in shape. Where the column is inclined the major portion of the void containing material which is lighter than the molten material on which it floats in the enriching section and through which it bubbles in the stripping section will tend to travel adjacent that portion of the columnar wall which is uppermost in displacing its own volume from the top portion of any given molten zone.

Fig. 4A is a front elevation and 4B a side elevation of a simple column-type zone-void refiner comprising rectification section 18, stripping section 19, feed tank 122 with associated heater windings 123, product outlet 20, waste outlet 21, heaters 22, and means of actuating these heaters. It is seen from Fig. 4A that there are two sets of four heaters each, each set being attached in fixed positions on a heater plate 23 or 24. In operation, heater plate 23 is actuated in a gradual upward motion and plate 24 in a downward motion by virtue of belt 25 which belt passes over pulleys 26, being driven by motor 27 and motor pulley 28. In operation, heaters 22 move upward in the enriching section and downward in the stripping section of the apparatus.

When the heaters have advanced an integral number of intervals, where an interval is the distance equal to the spacing between corresponding portions of adjacent heaters, arm 29, shown in Fig. 4B and attached to heater plate 23, actuates clutch release switch 30 thereby releasing magnetic clutch 31. Load weight 32 causes a rapid reverse travel until cam 29 actuates clutch bind switch 33 thereby causing the clutch to engage again whereupon the cycle is repeated. In order for the apparatus of Figs. 4A and 4B to be operative, it is necessary that there be molten material in feed tank 122 and that the uppermost position of top heater 22 in each of the columns 18 and 19 be close enough to tank 122 so that there is free interchange of the molten material within the heater with the feed material, and so that the voids within these heaters may pass into the feed tank. The feed tank may be heated by means of heater windings 123 and a current source not shown or by other conventional means. If the material being processed is easily contaminated and if the feed tank is open, a protective layer may be floated on the molten feed. In the processing of tin, a layer of lampblack has proved to be adequate.

In apparatus of the type depicted in Figs. 4A and 4B, corresponding points on the heaters are spaced at equal intervals and advance slowly a total distance equal to an integral number of these intervals. When the heaters have advanced an integral number of intervals, for Example 1, they are reversed rapidly an equal distance so that each heater coincides with the molten region which was previously behind it after which forward travel is then resumed. The heater should reverse rapidly enough to prevent substantial freezing of the material with the molten zones.

The minimum number of heaters in which a complete column of the type shown in Figs. 4A and 4B can be operated is two, one for the enriching section and one for the stripping section. As will be described below, it is possible with extremely simple apparatus to obtain the effect of a large number of stages of separation with this minimum number.

A saving in time is obtained, however, by placing a maximum number of heaters as close together as is feasible, the spacing being determined by the efficiency of heat transfer within the column. In the enriching section, the minimum spacing between heaters is determined by the requirement that a bridge of solid material be controllably maintained between the molten zones corresponding with adjacent heaters. In the stripping section, however, it is necessary that two solid bridges with a void between them be maintained between successive molten zones during part of the cycle so that the minimum heater spacing in this section of the apparatus is greater than for the enriching section, ranging in the order of twice the void height.

The practical number of heaters is a matter of design economics and is usually a compromise between minimum separation time and minimum apparatus cost.

When reciprocating heaters are used there must be a sufficient number so that extreme positions of the first and last heaters in either section in a given direction are separated by at least the length of the section.

An advantage of this reciprocating type of heater is that the apparatus design is somewhat simpler than that in which a continuous heater path is established. Heaters may be rigidly and permanently attached to a heater plate as shown in Figs. 4A and 4B and may be of any complete ring-type since there is no necessity of passing them by the feed inlet.

Fig. 5 is a front elevation of a column-type zone-void refiner in which there is established a continuous rotary path for the heaters. In this apparatus heaters 34 are attached to a rotating member 35. The heaters 34 are tightly fitted about the inverted Y-column 36 and are so shaped that their passage will not be obstructed by feed inlet 37. Void generators 38 and 39 operate in a manner which has already been described. Feed 40 is maintained in a molten condition by heater windings 41 adjacent feed tank 42. For a solute-solvent system having a $k$ of less than 1, product flows out tube 38 and waste out tube 39 with member 35 rotating in a counter-clockwise direction.

In the equipment shown in Fig. 5, Y-tube 36 is bent or formed in a circular arc approximating 180 degrees and motion of heaters 34 is continuous. If desired, however, the reciprocating principle of the apparatus of Figs. 4A and 4B may be utilized on the apparatus of Fig. 5 in which event, since it would not be necessary to cause heaters 34 to pass feed inlet 37, they may be of the ring-type. With continuous heater motion on the apparatus of Fig. 5 rectification and stripping action may be realized with a minimum of one heater.

In all of the column apparatus shown, the material of which the column is constructed is selected according to the needs of the system undergoing treatment. It may be glass, quartz, plastic, ceramic, graphite, metal or other material or may have a cross-section of duplex construction being largely of metal or other material and partly of glass, quartz, mica or other transparent material to permit viewing of the processing operation. Duplex structures may also avoid possible difficulties due to the expansion of the contents with melting or freezing of the material being processed, although with proper precautions a column composed entirely of brittle substance may be used. To prevent sliding of the solid zones downward especially for substances which contract upon freezing, the interior of the column may be roughened, threaded or otherwise provided with projections, support rods or indentations upon which the solids may key. Alternately, solids may be supported by a chain, cord, wire or tube suspended within the column. If a tubular support of a relatively deformable material is used, it will take up expansive strains produced by solidification or melting of the material undergoing treatment and thereby allow the use of a brittle material in the column wall which is not coexpansive with the material undergoing treatment.

Cross-sectional views of various column tubes and heaters are shown in Figs. 6A, 6B, 6C and 6D.

Figures 6A, 6B, 6C, 6D:
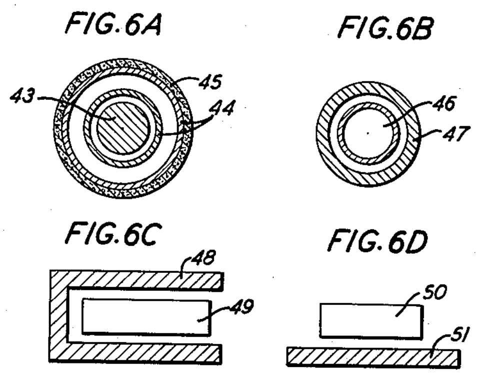
Figs. 6A, 6B, 6C and 6D are cross-sectional views of various column and heater configurations.

In Fig. 6A, heater 43 is tubular and is provided with windings at intervals (windings not shown). It moves within annular column 44 in which latter the material undergoing treatment is passed. Annular column 44 may be surrounded by heat insulation 45.

Fig. 6B is a section of a more conventional type tube refiner with the material passing through tube 46 and ring-type heater 47 sliding along its outer surface.

Fig. 6C is a section showing a U-type heater 48 fitted to a rectangular-shaped column 49. Such a configuration is useful where it is necessary to pass the heater by the feed intake or supporting structure.

Fig. 6D shows a rectangular-shaped column 50 heated by a plate heater 51. The heaters may be resistance windings, gas flames, induction coils, or other means known to the art.

A zone-void refiner of large cross-section is shown in Fig. 7. It consists essentially of two concentric half-cylinders 52 and 53 with strip-shaped heaters 54 mounted on a rotating drum or frame not shown. Feed is passed in inlet 55 and with effective continuous counter-clockwise heater motion, produced either by constant counter-clockwise heater travel or reciprocating travel with controlled refining rate counter-clockwise and rapid return an integral number of heater spacings in the opposite direction, product is drawn out of outlet and void generator 56 and waste out of outlet and void generator 57. By keeping the thickness of the column, that is, the space between half-cylinders 52 and 53 small, the zone lengths measured in the direction of travel may be kept small, thereby permitting a large number of zones or stages to exist concurrently. As will be discussed further on, the degree of separation attainable increases with the length of the column expressed in molten zone lengths.

In all of the methods discussed herein, it may be advantageous to provide cooling between the zones especially for substances having a low melting point or high thermal conductivity. This may be accomplished by blowing cooling gas at the region between the heaters, by submerging the apparatus in a cool liquid, or by providing heat exchangers in tubular form encircling the column. If the latter is used, some of the heat may be returned to the system in ways well known to those skilled in the chemical fields.

As has been mentioned, the type of void generator described in connection with Figs. 1A through 1F is exemplary only. Other types of void generators are shown in Figs. 8A through 8H. The chief requirement of the void generator is that it restrict the flow of molten material, and in the usual case, that it replace that portion of the molten zone which has been allowed to flow out with some material which is fluid at the operating temperature of the apparatus. In the case of a system utilizing a void fluid of a density less than that of the molten material undergoing treatment, this may be accomplished by keeping the void generators immersed in the void material, or, where the voids are to contain gaseous material, the entire apparatus may be operated in an atmosphere of such material. An example of the latter is in the refining of germanium or silicon where operation is conveniently carried out in a protective atmosphere of nitrogen or hydrogen.

As previously stated, for pedagogical reasons, the invention is being described in terms of a void fluid which is of a density less than that of the material undergoing treatment when the latter is in the molten phase.

It is necessary that the heater path be such that the material at the extremity of the exit tube be molten during some part of each cycle to allow flow and further that it be frozen during some part of each cycle to prevent flow. It may be desirable to provide means for cooling the exit tube at appropriate intervals to the latter end.

Figures 8A, 8B, 8C, 8D, 8E, 8F, 8G, 8H:
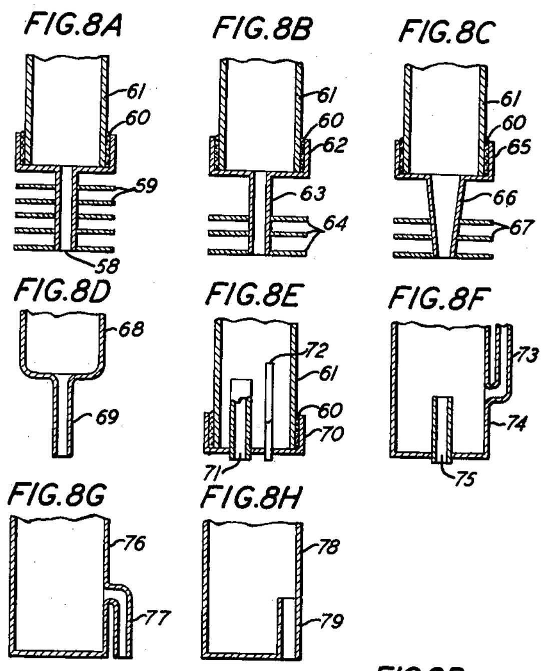
Figs. 8A, 8B, 8C, 8D, 8E, 8F, 8G and 8H are diagrammatic views of various types of void generators.

Fig. 8A is a schematic cross-sectional elevation of an external outlet type of void generator. In this view it is seen that outlet tube 58 having closely fitted cooling fins 59, is cemented by means of adhesive layer 60 or otherwise attached to the lower extremity of column 61. The purpose of fins 59 is to promote heating and cooling in a lateral direction so that the outlet tube can sense the position of the heater and in order to discourage heat flow in a longitudinal direction. The walls of outlet tube 58 are preferably thin.

Figs. 8B and 8C operate in a fashion identical to that of the generator depicted in Fig. 8A, their designs varying only slightly; Fig. 8B in the placement of the cooling fins and Fig. 8C in the shape of the outlet tube. The configuration of Fig. 8B comprises collar 62, external outlet tube 63 and fins 64. The generator of Fig. 8C comprises collar 65, outlet tube 66 and fins 67. Either configuration is connected to column 61 by adhesive 60.

Fig. 8D is a view of an outlet tube type of a void generator in its simplest form comprising simply column 68 and outlet tube 69.

Figs. 8E and 8F are views of void generators provided with vent tubes to promote the flow of liquid through the outlet. These vent tubes may be vented to the air, to a protective atmosphere or may be connected to a source of gas or liquid under pressure. Such a vent is sometimes desirable when handling a substance of low density or high surface tension. The generator depicted in Fig. 8E is of the reentant tube type and comprises collar 70, outlet tube 71 and vent tube 72. Collar 70 is shown attached to column 61 by means of adhesive 60.

In the apparatus of Fig. 8F the vent tube 73 projects from the side of column 74 and is bent upward so that the distance between the point at which it enters column 74 and its opening to the atmosphere or other fluid is greater than the maximum vertical dimension of a molten zone. As in Fig. 8E actual generation of voids is by virtue of reentrant tube 75.

Figs. 8G and 8H are diagrammatic views of columns 76 and 78 having outlet tubes 77 and 79 entering the sides of the respective columns at appropriate height.

The only requirement of a void generator is that it remove a controlled portion of the material in each successive molten zone, in the usual case displacing it with a "void fluid" of a density different from that of the material undergoing treatment. Other means of achieving this purpose will suggest themselves to a person familiar with the chemical processing art. For example, in place of any one of the types of void generators depicted in Figs. 1A or 8A through 8F, valves or stoppers actuated by the moving heaters and arranged so as to allow only a portion of the material within the molten zone to escape, can be used.

To achieve small values of the ratio of void-volume to molten zone-volume it may be desirable to reduce the diameter of a portion of the column adjacent the void generator. Furthermore, it is not necessary that the material be removed, and the void be formed, at the time when the heater is at the end of the column, although this will usually be the case. The void may be formed when the heater is some distance from the void generator, which may in such case be a separate, stationary heater winding at the end of the column actuated by the position of the heater.

There is an important factor to be considered in the choice of void generator design for use in refiners of the type described herein. In general, since, as will be shown, the degree of separation to be realized is proportional to the column length expressed in zone lengths, it is always preferable to use a generator which draws molten material from the extremity of the column thereby utilizing the entire column length. The generators depicted in views A, B, C and D of Fig. 8 fulfill this requirement. In the reentrant type of generator such as shown in Figs. 8E through 8H, the effective length of the column is reduced by the length of the reentrant tube.

In the stripping section or column this factor is of special significance. Here, there being no fresh material ahead of the molten zone, as it reaches the waste outlet, the material within the last zone length may be expected to freeze by normal freezing so that the final portion of this zone to freeze will have a greater concentration of solute than any other. Drawing out this final portion by an outlet type of generator will therefore result in more efficient stripping. In fact, as will be shown, since for some systems the greater part of the stripping action is dependent on the segregation brought about by normal freezing within the final zone in the direction of molten zone travel, use of a reentrant tube type of generator may materially reduce the effectiveness.

Certain advantages of zone-void refiners of the type described in conjunction with Figs. 4A and 4B, 5 and 7 are evident. The apparatus is very simple, the column in its simplest form being a U-tube or semicircular tube with one inlet port. The column itself contains no moving parts and has no moving solids within it. Within the column all motion is due to gravity and occurs in the liquid phase. No valves or flow controls are required as the solid zones block the flow of liquid and the flow rates and reflux ratios are varied simply by varying heater rate and capacity and by altering void generator dimensions.

A typical small refiner of one of the types shown in Figs. 4, 5 and 7, suitable for laboratory scale work, may have a column of, for example about ½ inch or more in diameter and an outlet tube of from 1/16 to ⅛ inch or more in diameter. Zone lengths may be about an inch in length with spacing between zones of the same order.

Figure 9A:
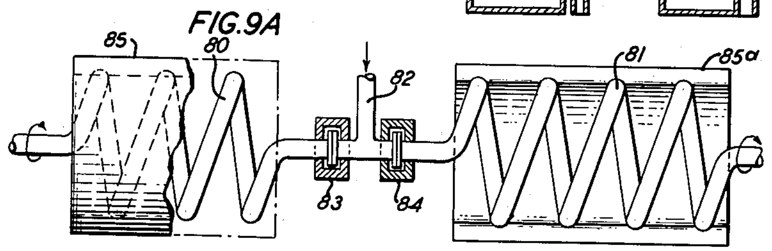
Fig. 9A is a diagrammatic front view of a spiral-type zone void refiner containing both enriching and stripping sections.

The processes of this invention may sometimes be carried out more expeditiously on spiral or helical apparatus such as that depicted in Fig. 9A. Advantages of spiral apparatus are that: only one source of heat is required for all zones thereby simplifying the heating problem, many molten zones can be produced in a short space, and the motion required is a simple rotation about the axis of the spiral. Heating and cooling may be by means of immersion of the lower portion of the spiral in a bath, although as will be seen it is sometimes necessary to resort to other heating means. The use of spiral apparatus for solid-vapor interchange has been described by A. F. Reid, Industrial and Engineering Chemistry, volume 43, page 2151, 1951.

Spiral apparatus may be formed of a coiled tube or if larger cross-section is desired, may comprise spiral ramps between inner and outer concentric cylinders. Such cylindrical apparatus may have but a single helical wall separating succeeding stages or may have a double wall so that heating or cooling fluid may make contact between turns thereby improving the heat transfer efficiency.

Spiral refiners can be operated with their axis in any position, horizontal, vertical or inclined, the principal requirement being that the portion of the helix in which the molten material and the void-fluid are in contact be inclined from the horizontal to a sufficient degree to expedite the flow of materials.

Voids may be generated in spirals as in columns by arranging to have a controlled portion of a molten zone at the end of a spiral run out the outlet tube of a void generator. As in column refining, the void generator may operate on the principle of blocking the outlet tube with solid material when the desired portion of a molten zone has been allowed to escape. This principle may be used on spirals in any position. Another principle of controlled void generation which may be used on horizontal or inclined spirals and is particularly suited for use on spiral refiners of the cylindrical type, discussed below in connection with Fig. 10, makes use of an outlet tube which is open at all times (that is hot enough to maintain the material in it molten) of such a shape or position as to allow a portion of the molten material within a molten zone to escape during each revolution.

Figure 9B:
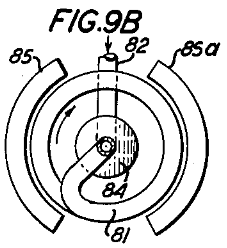
Fig. 9B is a diagrammatic end view of the apparatus of Fig. 9A.

Figs. 9A and 9B are front and end schematic views of a complete spiral zone-void refiner of the tubular type consisting of enriching section 81, stripping section 80 and feed section 82. Void generators at the outer extremities of sections 80 and 81 are not shown.

In the spiral type of zone-void refiner having both enriching and stripping sections, as in the columnar type of equipment, it is necessary to generate voids at the waste and product exits and to cause the voids in both sections to travel toward the common feed inlet between the two sections. As in the column refiner, in the enriching section the voids and molten zones must move in the same direction while in the stripping section they must move in opposite directions.

The directions in which voids and zones will travel in spirals depends upon whether the spiral is left- or right-hand and on whether the direction of rotation is clockwise or counterclockwise. For spirals having a horizontal axis, the location and extent of the angular sector which comprises the heated region is of importance. For spirals having a vertical axis, the heaters may be located anywhere about the periphery of the turns.

In constructing a spiral refiner, various combinations of hands, direction of rotation and heater location will work successfully. These are summarized in Table 1 below which also shows the heater location for horizontal spirals.

TABLE 1

| Section of Refiner | Hand of Spiral | Direction of Rotation [1] | Position of Heater [1] |
|---|---|---|---|
| Enriching | Right-Hand | Counter-clockwise | At left, bottom or top. |
| Do | Left-Hand | Clockwise | At right, bottom or top. |
| Stripping | Right-Hand | do | On left. |
| Do | Left-Hand | Counter-clockwise | On right. |

[1] As viewed from the exit end of the section.

With the apparatus of 9A and 9B rotating in a clockwise direction as viewed from the right, product rich in solvent flows out the right and waste rich in solute out the left. Feed inlet 82 is fixed in a vertical position and maintained in a heated condition so that the material within it is at all times molten. Connections between feed inlet 82 and stripping and enriching sections 80 and 81 are made by means of sliding joints 83 and 84. Although heating in the enriching section may be by means of a hot bath into which the lower part of the spiral is kept immersed, for a system having a $k$ value less than 1, heating in the stripping section must be by other means. Heater 85 shown in end view 9B, displaced from the horizontal to the left, produces the desired effect in the stripping section. Heater 85$a$ is shown properly positioned for the enriching section. This will be discussed in connection with Fig. 11.

Figure 10:
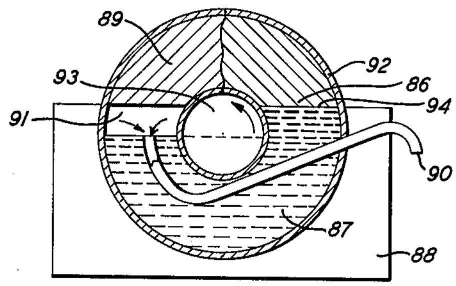
Fig. 10 is an end view of a spiral drum void refiner showing one type of void generator.

Fig. 10 is an end view of a spiral drum void generator suitable for use as the enriching section of a spiral apparatus for zone-void refining. Within the annular region between concentric cylinders 92 and 93, there is a molten region 87, produced by heating bath 88, and a solid region 89. With the cylinder in the position shown, a portion of molten material within region 87 has flowed out through outlet tube 90 which is fixed with respect to the drum so as to produce void 91. As the cylinder rotates in a counterclockwise direction, solid 89 melts, falls into molten region 87 and molten material at trailing interface 94 freezes into the solid at that turn of the helix adjacent and immediately behind the turn depicted. At each complete rotation of the cylinder a new void 91 is generated, these voids being caused to travel with molten zones 87 in a direction away from the viewer until the void reaches a feed inlet which performs the function of inlet 82 shown on Fig. 9A. At the inlet, not shown, feed is caused to displace whatever fluid is present in the void, the motion thereby corresponding to that in the enriching section of the column refiner described in connection with Fig. 1.

Void generators in equipment such as depicted in Fig. 10 may be directed radially through a sidewall as shown or may project axially through the end of the drum.

In the stripping section of a zone-void refiner, it is necessary that void travel be in a direction opposite to that of molten zone travel. This is accomplished in column refiners by causing the heaters, and consequently the molten zones to travel in a downward direction while the lighter void material being displaced by molten material bubbles through. This cannot be accomplished on a horizontal spiral with the molten region in the position and direction of rotation shown in Fig. 10 since the void fluid being lighter than the molten phase of the material undergoing treatment will continue to float on the surface of the molten zone.

As is shown schematically in Figs. 11A, 11B and 11C, stripping may be accomplished by displacing the heater from the horizontal. In this configuration molten zone 95 shown in Fig. 11A is produced by vertical heater 96. In this view it is assumed that void 97 has already been generated according to one of the methods which has been described. The other regions visible are solid region 98 in the front turn of the helix and solid region 99 shown through a broken section of the helix and present in the next succeeding turn into the page. As the spiral rotates, the direction now being clockwise as the refiner is seen from the waste end, void 97 becomes trapped in solid 99 as shown in Fig. 11B. Molten zone 100 is in the turn of the helix adjacent that containing molten zone 95 and solid region 101 is that solid which is present in the third turn of the helix. In Fig. 11C void 97 has entered the next molten zone 100 and has bubbled up through it to solid region 101 thereby causing molten zone 100 to travel in a direction opposite that of void 97. As in Fig. 10, void 97 continues to travel into the page until it reaches the feed inlet, new voids being generated with each complete turn of the helix.

Operation of the enriching section with a vertical motion zone is similar to that of Fig. 10, rotation now being counterclockwise as viewed from the enriching end of the apparatus with the solid and molten regions in the same relative positions shown in Figs. 11A, 11B and 11C. Here the solid material, as it melts, falls through the void and into the molten region so that the void is never trapped in the solid material and so that the void and molten zone travel in the same direction.

It is well known in the field of separation methods that when a desired component undergoes a high percentage of enrichment, the net flow through the various stages should differ for effective operation; see for example, H. D. Smyth, "Atomic Energy for Military Purposes," Princeton University Press, 1945, at page 167. Stated another way, the downflow should vary, being greater for successive stages approaching the feed inlet. The effect of variable downflow can be achieved quite simply in the zone-void process by varying the volume of the molten zones as they travel. This may be done either by varying the cross-section of the zones while keeping the zone length constant as in Fig. 12, or by varying the zone length in a column of constant cross-section as in Fig. 13 or by a combination of the two methods. Zone length may be varied by varying the amount of heat transferred from the heaters to the material undergoing treatment as by varying the heater area as shown in Fig. 13, by varying the temperature of the heaters, etc.

The apparatus of Fig. 12 operates in a manner identical to that of Figs. 4A and 4B, feed passing in through feed inlet 112, product passing out void generator 102 and waste being withdrawn through void generator 103. In the apparatus shown the motion of heaters 104 is reciprocating, traveling gradually up in enriching section 105 and down in stripping section 106 and then rapidly in the opposite direction to complete the cycle of heater motion. Motion of the heaters 104 may be brought about by apparatus such as that shown in Figs. 4A and 4B.

The broken section shown in Fig. 13 is of a column 107 having heaters 108 varying in surface area and containing solid regions 109, molten regions 110 and voids 111 produced by void generators not shown. In such an apparatus motion of the heaters 108 is reciprocal. If travel is gradual in an upward direction, the section depicted is that of an enriching column, whereas if it is gradual in a downward direction, the process represented is stripping for a system having a $k$ value less than 1.

The following relates to the theoretical considerations involved in the design and operation of apparatus suitable for the processes of this invention. The basic characteristic of the zone-void processes will be described largely by analogy to the well-known multistage process, distillation. However, basic differences between the zone-void processes and distillation will become apparent. Then mathematical equations will be given for the exit concentrations in terms of the feed concentration and significant parameters of the apparatus. Finally, an illustrative calculation and a discussion of general design considerations will be presented.

Consider a distillation column operating at total reflux, that is, under the condition that no waste or product is withdrawn. When the steady state is reached, there is a rising stream of vapor and a descending stream of liquid. The number of stages which such a column must contain to separate feed into tops of composition $y_D$ and bottoms of composition $x_B$ is given by Fenske's equation:

$$\text{Minimum number of stages} = \frac{\log_e \left[\frac{y_D(1-x_B)}{x_B(1-y_D)}\right]}{\log_e \alpha} \quad (1)$$

where $$\alpha \text{ is the separation factor defined as } \alpha = \frac{y(1-x)}{x(1-y)} \quad (2)$$

where $x$=mol fraction of lighter component in liquid phase
$y$=mol fraction of lighter component in vapor phase and where both values $x$ and $y$ are taken for a given stage. The number of stages given by Fenske's Equation 1 is the minimum number which can perform the indicated separation for operation at total reflux. In practice, since flows of feed, waste and product must be maintained, the process must be operated at partial reflux giving somewhat less separation per stage. The minimum number of stages for practice operation at partial reflux may be in the range of from 1.5 to 3 times the minimum number of stages given by the Fenske equation.

In a distillation column the number of stages is proportional to the number of plates in a bubble plate column or to the height in a packed column.

The above discussion on the theory of distillation and much of the general theory which will not be discussed at length has been excerpted from "Multistage Separation Processes" by Manson Benedict, Transactions of the American Institute of Chemical Engineers, volume 43, pages 41 through 60, February 1947.

Since Fenske's equation gives essentially the number of factors of $\alpha$, the separation factor Equation 2 contained in the ratio of the exit concentrations, Equation 1 may be rewritten as $$\frac{y_D(1-x_B)}{x_B(1-y_D)} = \alpha^{N_m} \quad (3)$$

where $N_m$=the minimum number of stages.

It will be shown that the separation which can be produced by zone-void refining under conditions corresponding to total reflux can be expressed in an equation similar to Equation 3.

Benedict also gives equations for the minimum downflow, $L_{min.}$ at which a cascade just ceases to separate and points out the following features of $L_{min.}$:

1. It is inversely proportional to the enrichment factor, $\alpha-1$, so that $L_{min.}$ must increase as $\alpha$ approaches unity.
2. It increases as the difference in concentration between the material in the stage and the product increases. For this reason the downflow as either terminus of the equipment is approached from the feed plate, may be reduce. Examples of means by which such reductions may become effective are depicted in Figs. 12 and 13.

Minimum downflow is also commonly expressed in terms of a minimum reflux ratio, L/D, where L is the downflow and D is the flow of tops. (For the use of this terms see, for example, Badger and McCabe "Elements of Chemical Engineering," 2nd edition, 1936, at page 351.) It will be shown below that the ratio of molten zone length to void length in the zone-void refiner is analogous to reflux ratio.

Certain analogies between zone-void separation and distillation and other well-known separation processes follow:

*Relationship between α and k*

The relationship between distribution coefficient $k$, used in zone refining and separation factor $\alpha$, used in distillation follows:

In binary systems involving the liquid-solid transformation, it has been customary to think of one component as the solute, the other as the solvent, and to express the ratio of solute concentration in the freezing solid to that in the liquid from which it freezes by the distribution coefficient $k$ above discussed. Methods by which equilibrium values of $k$ can be computed by reference to the constitutional diagram of this system, and also methods by which these values may be obtained from thermodynamic considerations are well known. See, for example, A. Hayes and J. Chipman, Transactions A. I. M. E. volume 135, at page 85. Effective values of $k$ under actual solidification conditions deviate from the equilibrium values. The effective value, where it does deviate, invariably has the effect of lowering the value of the quantity $1-k$. In brief, deviation from the equilibrium value is brought about by poor diffusion of the solute in a molten region or any diffusion of the solute in the solid region. Various means of causing the effective value of $k$ to approach the equilibrium value and thereby of improving separation efficiency are; mixing the molten region, maintaining a sufficiently slow rate of crystallization so that there is little entrapment of solute in the solid region, and increasing the temperature gradient at the liquid-solid interface.

The effective $k$ values for various binary systems have been reported in the literature. See, for example, Hayes and Chipman, supra, for $k$ values of various solutes in iron; W. G. Pfann, Journal of Metals, volume 4, page 861, and R. N. Hall, Physical Review, volume 88, page 139, for solutes in germanium; and R. H. McFee, Journal of Chemical Physics, volume 15, page 856 for solutes in sodium chloride.

The relationship between $k$ and $\alpha$ is brought out by the following illustrative calculation:

*Illustrative calculation 1*

It is desired to purify germanium containing arsenic as an impurity solute. A $k$ value of 0.1 is assumed. Purified germanium is considered as the product emerging in the top of the column. Hence, $y_D$=mol fraction of germanium at the tops
$x_B$=mol fraction of germanium at the bottoms where $y$ refers to the solid phase and $x$ to the liquid phase. Assuming the very low concentration of arsenic of less than 1 per cent, such materials now finding widespread use in transistor manufacture, $y_D$, $yx$ and $x_B$ are all very close to 1.

As has been discussed above:

$$k = \frac{\text{arsenic concentration in the solid leaving a molten zone}}{\text{arsenic concentration in the liquid in the zone}} = \frac{1-y}{1-x} = 0.1$$

According to Equation 2 above:

$$= \frac{y(1-x)}{x(1-y)} = \frac{1}{(1)(0.1)} = 10$$

In general then, for zone-void refining:

$$\alpha=\frac{1}{k}$$

In zone-void processing the direction in which the components travel is as follows:

1. For a system in which the $k$ value of a solute in a solvent is less than 1, that is, for a system in which the presence of solute lowers the melting point, the concentration of solute is greater in the molten zone than in the solid region at the interface and, therefore, the solute travels with the molten zones, solvent traveling in the opposite direction.

2. For a system having a $k$ value greater than 1, that is, for one in which the melting point of the solution is higher than that of the pure solvent, solvent travels with the molten zones and solute in the opposite direction.

Since in the preceding portion of the specification the refining process has been described in terms of recovery of a purified solvent from a solution in which the $k$ value of the solute under consideration is less than 1, the molten zones enter the column at the end from which the product is withdrawn (the "top" of the column).

*Relationship between length of distillation column and length of zone-refining column*

The condition in zone refining which corresponds to the steady state at total reflux in distillation is a steady state reached after a large number (theoretically an infinite number) of zones passes through the ingot. Furthermore, this is the steady state in zone-void refining at total reflux since when no flows of feed or product occur, zone-void refining reduces to batch-zone refining. The ultimate distribution as given in "Principles of Zone Refining," supra, gives the solute concentration C as a function of distance $x$ from a starting end of an ingot or charge as follows:

$$C=Ae^{Bx} \qquad (4)$$

where $$k=\frac{Bl}{{}_eBl_{-1}} \qquad (5)$$

and $$A=\frac{C_0BL}{{}_eBL_{-1}} \qquad (6)$$

where $l$=zone length
$L$=ingot or column length
$C_0$=mean solute concentration It is seen from Equation 4 that at $x=0$ (that end of the column at which the molten zones enter) the constant, A, is equal to the solute concentration. In zone-void refining the ration $A/C_o$, which is a purification ratio, may, therefore, be written as $C_p/C_f$, the ratio of the solute concentration of product to the solute concentration of feed, in the enriching section of the refiner.

By solving Equation 6 for a wide range of values of $k$, $l$, and L, it is found that $A/C_o$ can be empirically represented as follows:

$$A/C_o=C_p/C_f=k^{fN} \qquad (7)$$

where $f$ is a factor given in Table II and $N=\frac{L}{l}$=the number of molten zone lengths in the ingot or column section.

Equation 7 has the same form as the rewritten Fenske Equation 3 and tells us that $f$N is the number of stages of separation which can be produced by zone-void refining at total reflux in a column section of length N.

Values of factor $f$ in Equation 7 corresponding with four different numbers of molten zone lengths N and five different values of distribution coefficient $k$, are given in the following table:

TABLE II

[Values of $f$ in Equation 7]

| | N=2 | N=10 | N=50 | N=250 |
|---|---|---|---|---|
| k=.01 | 1.1 | 1.3 | 1.4 | ---------- |
| k=.1 | 1.1 | 1.4 | 1.5 | ---------- |
| k=.5 | 1.1 | 1.4 | 1.7 | ---------- |
| k=.9 | 1.0 | 1.2 | 1.6 | 1.9 |
| k=.99 | 1.0 | 1.1 | 1.2 | 1.6 |

The flows of matter in a multistage continuous separation process may be separated into two parts, the flows of feed, waste and product, and the flows which constitute the counter-current or reflux aspects of the process. In processes such as distillation, for example, these flows are readily distinguishable as actual amounts of matter moving up or down the column, the flow rates of which are readily measurable.

In the zone-void process, the net flows of feed, waste and product designated F, W and P, are determined by the volume flows of voids and are related by the material balance equation:

$$F=W+P \qquad (8)$$

In the enriching section the net volume flow P from feed inlet to product outlet is equal and opposite to the volume flow rate of voids from product outlet to feed inlet as given by the equation:

$$P=\frac{A_ev_e(h-l)_e^2}{D_e} \qquad (9)$$

in which $A$=cross-sectional area of column
$v$=linear velocity of void motion
$(h-l)$=length of a void
$d_e$=length between successive void-fronts A similar equation may be derived for the stripping section:

$$W=\frac{A_sv_s(h-l)_s^2}{d_s} \qquad (10)$$

In Equation 9 subscript $e$ stands for enriching section while the subscript $s$ in Equation 10 stands for stripping. These parameters may be independently controlled in each of the two sections. Another way to describe the flows of waste and product is to recall that one void travels through a column section each time a heater passes the end of the section.

In distillation, a counter-current flow exists between rising vapor and falling liquid and calculations of column performance involve these flows in the form of the reflux ratio. In the zone-void process the effects of counter-current flow between solid and liquid phases are achieved by the traveling molten zones. While the liquid of the zones does not flow in the same sense as the liquid in the distillation column, the effect on solute distribution of passing a molten zone down a column is essentially the same as if the same volume of liquid actually flowed down the column equilibrating itself with the solid as it traveled. Thus, in zone-void refining the quantity analogous to the downflow in distillation is essentially the volume rate of flow of molten regions down the column, that is, toward the waste exit.

In the usual operation of the refiner, one void accompanies each molten zone so that it is seen that the ratio of molten volume to void volume inside a heater is analogous to a reflux ratio, the ratio being determined by the effective heater length $h$, and temperature and by the effective length $l$ of the outlet tube of the void generator. Thus $l/(h-l)$ may be regarded as a reflux ratio, for purposes of understanding the process. The operating equations below will not use the reflux ratio as such.

Another unique aspect of molten zones as reflux media is the degree of contact between the counter-current phases. In distillation practice the approach to ideal equilibrium is limited by the degree of contact, that is, the interfacial area between solid and vapor and by the diffusion of components in the liquid. In molten zone reflux or, zonal reflux, the degree of contact may be regarded as perfect in that the solid phase is completely melted into the liquid phase throughout the cross-section of the refiner. Diffusion in the liquid remains a limitation although this effect may be minimized by using a low rate of travel or by introducing stirring means as has been discussed elsewhere. An important aspect of the perfect degree of contact afforded by zonal reflux is that column construction is greatly simplified, there being no need to resort to the use of bubble caps or packing media.

The volume flows of feed, waste and product in the rectification and stripping sections will now be described after which the exit solute concentrations of the zone-void refiner will be given in terms of feed concentration and other significant parameters of the process. Separate equations for the enriching and stripping sections will be given.

The enriching and stripping sections meet at the feed inlet or tank and have in common feed concentration $C_f$. Feed which enters the system may be regarded as dividing into two portions, one of which travels through each section. The action of the molten zones in the enriching section is to remove solute from the portion of the feed which travels through that section and to transfer this solute to the feed tank. The action of the stripping section is to remove solvent from the portion of the feed which travels through that section and to transfer the solvent to the feed tank. In order for the feed tank to remain at concentration $C_f$, it is therefore necessary to balance the flows of waste W and product P so as to leave $C_f$ unchanged. The ratio of P to W will depend upon the vales of $C_p$ and $C_w$ as follows:

Let $$C_p=\alpha C_f \qquad (11)$$

$$C_w=\beta C_f \qquad (12)$$

where $\alpha$ and $\beta$ are constants.

The overall material balance for the refiner is:

$$F=W+P \qquad (13)$$

where F=flow rate of feed.

The overall solute balance is:

$$FC_f=WC_w+PC_p$$

or, substituting the values of $C_p$ and $C_w$ of Equations 11 and 12:

$$FC_f=W\beta C_f+P\alpha C_f$$

or $$F=W\beta+P\alpha \qquad (14)$$

or $$\frac{P}{W}=\left(\frac{\beta-1}{1-\alpha}\right) \qquad (15)$$

Consequently, if the concentration of the solute in the feed is known and it is desired to get some given solute concentrations in waste and product, the values of $\alpha$ and $\beta$ may be determined by substitution in Equations 11 and 12. These values may, in turn, be substituted in Equation 15 to give the required ratio of product-to-waste (volume) flows. This product-to-waste ratio may be obtained in various ways, for example, by varying the cross-sections of the two sections of the column, by varying the void lengths, by varying the spacing of the heaters or by otherwise varying the rates at which the material is swept by molten zones.

*Enriching section equations*

The following events occur when a molten zone travels through the enriching section from the product exit to the feed inlet:

(1) A void is formed by drawing out a length $(h-l)$ of molten material at the product end of the column.

(2) As the void travels through the section, the net effect is to shift the solute distribution in the section a distance $(h-l)$ or one void length toward the exit.

(3) As the molten zone travels through the section it transports solute toward the feed inlet or in a direction opposite of the shift caused by the void concentration.

(4) When the molten zone arrives at the feed inlet or tank, the liquid in the zone mixes in the feed liquid and thereby attains the constant concentration $C_f$. In the system which has been assumed for the purpose of this discussion, that is, one in which the $k$ value of the solute in the solvent is less than 1, the concentration from the molten zone just before it reaches the feed inlet is greater than $C_f$ so that the effect is that of a transfer of solute from the product outlet to the feed inlet.

When the steady state has been reached, the sequence of steps 1 to 4 leaves the solute distribution in the column section unaltered. Because of the discontinuity in concentration at the feed inlet, the steady state distribution will actually fluctuate about a mean value during operation of the column. Such fluctuation will be of negligible importance except when the section length is very small, insofar as the equations which follow are concerned. It can be shown that the section length, $L_\epsilon$, required for a separation ratio $\alpha$ in the enriching section is given by:

$$L_\epsilon=\frac{1}{0.434B_\epsilon}\log \omega\left(\frac{\psi}{\alpha}-1\right) \qquad (16)$$

where B , $\omega$, and $\psi$ are constants depending on $h$, $l$, and $k$, and are given by:

$$e^{B_\epsilon h}=1+B_\epsilon\left(\frac{l}{k}\right) \qquad (17)$$

$$\omega=\frac{k}{(1-k)Bl}[1-1^{B_\epsilon(h-l)}] \qquad (18)$$

$$\psi=\frac{hk-l}{h-l} \qquad (19)$$

The length L of the enriching section in Equation 16, where subscript $\epsilon$ denotes enriching section, is defined as the distance from the exit end to the point at which the solute concentration in the solid is $kC_f$. In practice this length will usually be about one heater length less than the actual section length.

*Design of enriching section*

Determination of the proper column section length from Equations 16 through 19 will be shown by the following calculation:

*Illustrative calculation 2*

Given $\alpha=C_p/C_f=0.01$, $k=0.5$, $h=1$, $l=0.8$, find $L_\epsilon$.

From (17):

$$e^{B_\epsilon}=1+B_\epsilon\frac{(0.8)}{(0.5)}$$

$$B_\epsilon=0.87$$

From (18):

$$\omega=\frac{0.5}{(0.5)(0.87)(0.8)}[1-e^{0.87(1-0.8)}]$$

$$\omega=-0.27$$

From (19):

$$\psi=\frac{(1)(0.5)-0.8}{1-0.8}=-1.5$$

From (15):

$$L_\epsilon=\frac{1}{(.434)(.87)}\log\left[(-0.27)\frac{(-1.5)}{(.01)}-1\right]=4.2$$

These equations place certain limitations on the ratio $l/h$, which are somewhat analogous to the existence of the concept of minimum reflux ratio in distillation. Thus, for $k$'s less than unity, there exists no lower limit on the attainable value of $\alpha$ provided that $l/h$ is greater than $k$. If $k$ is less than unity and $l/h$ is less than $k$, there will be a minimum value of $\alpha$ even for a column section of infinite length. If $k$ is greater than one (for which case $\alpha$'s greater than one are desired) there is no upper limit on $\alpha$.

*Stripping section equations*

The following events occur when a molten zone travels through the stripping section from the feed inlet to the waste outlet where the void generator is of the outlet type:

(1) The heater at its starting position adjacent the feed liquid, $x = 0$, melts solid from 0 to $h$, $h$ being the heater length, allowing the melted portion to mix with the feed liquid. The solute concentration of the liquid within the heater is, therefore, identical with that of the feed liquid ($C_f$). This results in the introduction of solute into the stripping section since $C_f$ is greater than the mean concentration which is replaced.

(2) The molten zone travels through the stripping section, the first concentration to freeze out at position $x = 0$ being $kC_f$.

(3) The material within the final zone length of the molten zone in its ultimate position within the stripping section freezes by normal freezing. This final zone length is defined as $(L_s-h)$, where $L_s$ is the length of the stripping section.

(4) When the solid interface reaches $L_s-h+l$, where $l$ is the length of the outlet tube of the void generator, the remaining liquid runs out as waste. This liquid is highly concentrated solute due to the stripping action in the section and the normal freezing action over the last zone length. Its concentration may be readily calculated as will be shown.

(5) The void which is formed each time the heater passes the exit tube travels through the stripping section to the feed tank, rising through each molten zone as it is encountered. The average rate of travel of the voids depends on the heater length and on the spacing between heaters.

(6) In its travel, the molten zone encounters a nummer of voids. Each encounter advances the zone one void length $(h-l)$. One encounter occurs for each heater ahead of the heater at the feed tank, because each such heater in effect produces one void which eventually must pass the heater in question. These advances shorten the effective length of the section for refining.

As in the enriching section, a fluctuating steady state is reached. It can be shown that the section length $L_s$ required to produce a separation, $\beta=C_w/C_p$, is given by:

$$L_s=\frac{1}{(0.434)B_s}\log\left[\frac{\beta\delta-k}{\gamma}+1\right] \qquad (20)$$

where $B_s$, $\alpha$, and $\gamma$ are constants depending on $h$, $l$, $k$, and $\beta$, and are given by:

$$e^{B_s l}=1+B_s\left(\frac{h}{k}\right) \qquad (21)$$

$$\delta=k\left(\frac{h-l}{h}\right)^{1-k} \qquad (22)$$

$$\gamma=\frac{(h-l)\beta-h(1-k)}{(1+B_s h-e^{B_s h})}\cdot B \qquad (23)$$

The length $L_s$ of the stripping section in Equation 20 is defined by:

$$L_s=L'_s-h-n_v(h-l) \qquad (24)$$

where $L'_s$ is the actual section length and $n_v$ is the number of void encounters.

The quantity $\delta$ in Equation 20 represents the contribution of the solute concentration produced by normal freezing action when the molten zone reaches the end of the section. Its value is the ratio of the concentration in the solid at the start of normal freezing action to that of the liquid which is ejected as waste at some later time during the normal freezing process. Under certain conditions the normal freezing action represents the major part of the solute concentrating action in the stripping section. In such cases, it may be desirable for reasons of simplicity of apparatus to have a very short stripping section, one heater length long, in which normal freezing constitutes the entire action.

*Illustrative calculation 3*

Given $h=1$, $l=0.9$, $k=0.5$, $\beta=C_w/C_f=3.5$, find $L'_s$.

From (21):

$$e^{0.9B_s}=1+B_s\frac{(1)}{(0.5)}$$

$$B_s=+1.40$$

From (22):

$$\delta=(0.5)\left(\frac{0.1}{1}\right)^{0.5}=0.158$$

From (23):

$$\gamma=\frac{(0.1)(3.5)-1(0.5)}{(1+1.40-e^{1.40})}(1.40)=+0.127$$

From (20):

$$L_s=\frac{1}{(0.434)(1.40)}\log\left[\frac{(3.5)(.158)-0.5}{0.127}+1\right]=+0.26$$

From (24):

$$L'_s=L_s+h=1.26$$

(The section length is too short to have more than one heater. Hence $n_v$ is zero.)

In general a limited range of $\beta$ values is possible for certain ranges of $h$, $l$, and $k$, as $L_s$ is varied from zero to infinity. For $k$'s less than one, the approximate equations which have been given show that $\beta$ will lie between the values:

$$\left(\frac{h}{h-l}\right)(1-k)$$

and $$\left(\frac{h}{h-l}\right)^{1-k}$$

as $L_s$ is varied from zero to infinity.

It has now been shown how to calculate the lengths of the enriching and stripping sections for given values of $C_f$, $C_p$, $C_w$, $h$ and L. Assuming void length and the number, spacing and rate of advance of the heaters to be the same in each section, the relative cross-section areas of the sections will be given by $$\frac{P}{W}$$

in Equation 15. For the examples considered above, which are consistent with one another, $$\frac{P}{W}$$

is found to equal 2.52 and $(h-l)_e$ $2(h-l)_s$, which means that for the example given, the cross-sectional area of the enriching section is five times that of the stripping section.

Certain practical design matters will now be considered.

Since the degree of separation for given column dimensions depends only on the number of zone lengths in the column section, any degree of separation described by the equations above can be accomplished by a minimum of one heater in each section. However, as discussed earlier, a time saving will be realized if the heaters are spaced together as closely as possible. A limitation on minimum inter-heating spacing in addition to that indicated earlier occurs when the diffusion rate of the solute in the solid is high, in the extreme case being comparable to the diffusion rate in the liquid. When such systems are undergoing treatment, it may be advisable to cool the solid between the heaters and to increase the length of the solid zones.

A shorter inter-heating spacing results in less hold-up and in lower start-up time, that is, it will take less time to reach the steady state. Small zone length *l*, as indicated above, permits more stages of purification in a given column length and also reduces start-up time.

The approach to the steady operating state will be more rapid the greater the deviation of segregation constant *k* from unity. An analogous situation prevails in other continuous processes such as distillation. This fact emphasizes the value of a continuous zone refining method, for, once the steady state is reached, all material processed receives the maximum separation; and the time required to pass a quantity of feed through the refiner is relatively short compared to the time to attain the steady state.

In common with batch-zone refining, the zone-void process is particularly applicable to crystallization from the melt and to systems in which bulk solids can be readily frozen with a smooth liquid-solid interface and without entrapment of liquid. With respect to crystallization from solvents, the zone-void process has a distinct advantage over batch methods in that fresh solvent can be continuously introduced and removed. For solute-solvent systems having a tendency to freeze out fine crystals either process can still be used to advantage, even though the situation is somewhat less ideal.

Due to the high degree of purity control required in the manufacture of semiconductor devices the processes described are particularly useful in the preparation of materials for use in such devices. These materials include the elemental semiconductors such as silicon and germanium and compounds having similar properties such as aluminum phosphide, aluminum arsenide, aluminum antimonide, gallium phosphide, gallium arsenide, gallium antimonide, indium phosphide, indium arsenide and indium antimonide.

The invention has, of necessity, been described in terms of specific embodiments. Various modifications will be apparent to those skilled in the art. For example, while complete refiners have been discussed, it is evident that refiners with only one section, either rectifying or stripping, in which the feed inlet is adjacent either of the exits, can also be operated on the void-zone principle. It is also evident that reciprocating heater motion may be used with spiral zone columns and that this may be advantageous from the design viewpoint for a particular apparatus. The description above is intended to be illustrative of, but not necessarily to constitute a limitation upon, the scope of the invention.

In the following claims wherever the term "column" is used it is to be understood that the term is meant to include horizontal as well as vertical columns, those inclined in any intermediate angle from the horizontal, those which are in spiral form and all types of chambers having openings at either end of any cross-sectional shape whatsoever.

What is claimed is:

1. The process of redistributing the ingredients of a fusible material containing at least two ingredients within a column comprising causing relatively hot and cold regions alternately spaced to progress in one direction from one end of the column to the other, the fusible material being molten within the hot regions and solid within the cold regions, removing material from an end of the column in an amount less than the amount contained within a hot region each time the material at that end of the column is molten and adding at another point along the column fusible material of the system undergoing treatment in an amount equal to the amount withdrawn.

2. The process of redistributing the ingredients of a fusible material containing at least two ingredients within a column comprising causing relatively hot and cold regions alternately spaced to progress in one direction from one end of the colum to the other, the fusible material being molten within the hot regions and solid within the cold regions, removing material from each end of the column in an amount less than the amount contained within a hot region each time the material at an end of the column is molten and adding, as feed, fusible material of the system undergoing treatment in an amount equal to the total amounts withdrawn.

3. The process of redistributing the ingredients of a fusible material containing at least two ingredients within a column at an angle of more than 0 degrees from the horizontal comprising causing relatively hot and cold regions alternately spaced and in fixed relative positions to progress upwardly from one end of the column to the other, the fusible material being molten within the hot regions and solid within the cold regions, removing as product each time the material at the top of the column is molten an amount of material less than the total contained in the uppermost hot region at its maximum volume, withdrawing from the bottom of the column an amount of material less than the total amount contained within a hot region at its maximum volume each time a hot region is coincident with the bottom of the column and adding, as feed, at the top of the column, an amount of material of the system undergoing treatment equal to the total of the amounts withdrawn from the top and bottom.

4. The process of redistributing the ingredients of a fusible material containing at least two ingredients within a column at some angle greater than 0 degrees from the horizontal comprising causing relatively hot and cold regions alternately spaced in fixed relative positions to progress downwardly from the top of the column to the bottom, the material in the hot regions being molten and the material within the cold regions being solid, removing from each end of the column an amount of material less than the maximum amount contained within a hot region and adding, as feed, at the top of the column material of the system undergoing treatment in an amount equal to the total of amounts withdrawn.

5. The process of redistributing the ingredients of a fusible material containing at least two ingredients within a column having a feed inlet at a position intermediate the ends and having outlets at either end comprising causing relatively hot and cold regions alternately spaced to progress in one direction from one end of the column to the other, the fusible material being molten within the hot regions and solid within the cold regions, each time the material within either end of the column is within a hot region removing a portion of said material, and adding, through the feed inlet, material of the syster undergoing treatment in an amount equal to the amounts withdrawn at both ends of the column through the feed inlet.

6. The process of redistributing the ingredients of a fusible material containing at least two ingredients within a U-shaped column, having a product outlet at each end and a feed inlet at an intermediate position, comprising causing relatively hot and cold regions alternately spaced to progress in one direction from one end of the column to the other, the fusible material being molten within the hot regions and solid within the cold regions, removing from each hot region in its initial position at one end of the column material in an amount less than the total contained within a hot region, removing from each hot region in its final position in its direction of travel through the column material in an amount less than the total contained within a hot region and adding, through the feed inlet, material of the system undergoing treatment in an amount equal to the total of the amounts withdrawn from both ends of the column.

7. The process of claim 5 in which the feed inlet is at a different elevation from either outlet and in which all other parts of the column are at intermediate elevations.

8. The process of claim 5 in which the column is in the form of a spiral and in which the motion of alternate hot and cold regions is brought about by rotation of the spiral about its axis by fixed position heat exchangers.

9. The process of redistributing the ingredients of a fusible material containing at least two ingredients within a U-shaped column having a feed inlet at the closed end of the U and an outlet at either end of the column comprising causing molten zones to travel through the column from one end to the other, each time a molten zone is at its initial position at an end of the column producing a void within the molten zone by removing an amount of molten material less than the total contained within the zone, each time a molten zone is at its final position in its direction of travel through the column creating a void within said zone by removing an amount of molten material from the zone less than the total contained within the zone and adding, as feed through the feed inlet, fusible material of the system undergoing treatment by causing it to fill up each void as it passes by the feed inlet.

10. The process of redistributing the ingredients of a fusible material containing at least two ingredients within a U-shaped column having a feed inlet at the closed end and an outlet at each of the open ends and in which the plane of the column is at an angle of more than 0 degrees from the horizontal comprising causing spaced molten regions to traverse the colummn from one end to the other, the dimensions and spacing of said molten region being such that they include the entire cross-section of the column and such that they are bridged at all times by solid material, removing from each molten zone at its position at each end of the column a portion of material in an amount less than the total amount contained within said molten zone and adding, as feed through the feed inlet, molten material of the system undergoing treatment in an amount equal to the total amounts withdrawn.

11. The process of redistributing the ingredients of a fusible material containing at least two ingredients within a hollow receptacle having openings at either end and a feed inlet at an intermediate position, comprising causing relatively hot and cold regions alternately spaced in fixed relative positions to traverse the receptacle from one end to the other, the fusible material being molten within the hot regions and solid within the cold regions, removing material from one end of the receptacle in an amount less than that contained within a hot region in its position at that end of the receptacle, replacing the amount withdrawn with a void material substantially immiscible with the material undergoing treatment, causing this void material to traverse the receptacle in the same direction and at the same rate as the hot region travel, removing material at the other end of the receptacle in an amount less than that contained within a molten region in its position at that end of the receptacle, replacing the material withdrawn with an additional amount of the said void material, causing voids so generated to travel in a direction opposite to that of hot region travel and, each time a void reaches the feed inlet, displacing the material therein contained with additional fusible material of the system undergoing treatment.

12. The process of claim 11 in which the feed inlet is at a different elevation from that of either outlet and in which void travel is effected by gravity.

13. The process of claim 1 in which hot region travel is produced by corresponding motion of heat sources, which heat sources are caused to progress in the direction of hot and cold region travel for a distance equal to a digital number of cold regions after which said heat sources are caused to travel in the opposite direction an equal number of cold region lengths at such a rate as to permit the material in the hot regions to remain molten and as not to render a significant amount of additional material molten during their reverse travel and at least once repeating the aforesaid series of steps.

14. The process of redistributing the ingredients of a fusible material containing at least two ingredients comprising causing relatively hot and cold regions alternately spaced to progress in one direction from one end of the column to the other, the fusible material being molten within the hot regions and solid within the cold regions, hot region travel being produced by corresponding motion of heat sources, which heat sources are caused to progress in the direction of hot and cold region travel for a distance equal to a digital number of cold regions after which said heat sources are caused to travel in the opposite direction an equal number of cold region lengths at such a rate as to permit the material in the hot regions to remain molten and as not to render a significant amount of additional material molten during their reverse travel and at least once repeating the aforesaid series of steps.

References Cited in the file of this patent

UNITED STATES PATENTS

| | | |
|---|---|---|
| 2,361,382 | Camin | Oct. 31, 1944 |
| 2,615,060 | Marinace et al. | Oct. 21, 1952 |

OTHER REFERENCES

Journal of Metals, Nov. 1953, 1428–9 (Schumacher), 148–S. C.

Pro. of Phys. Soc., 49, pages 152–158.